United States Patent [19]

Zimmer

[11] Patent Number: 4,808,996

[45] Date of Patent: * Feb. 28, 1989

[54] SIMULTANEOUS DIGITIZING APPARATUS FOR AN ACOUSTIC TOOL

[75] Inventor: Mark D. Zimmer, Katy, Tex.

[73] Assignee: Halliburton Company, Duncan, Okla.

[*] Notice: The portion of the term of this patent subsequent to Aug. 4, 2004 has been disclaimed.

[21] Appl. No.: 78,135

[22] Filed: Jul. 27, 1987

Related U.S. Application Data

[60] Division of Ser. No. 869,790, Jun. 2, 1986, Pat. No. 4,684,947, Continuation of Ser. No. 530,283, Sep. 8, 1983, abandoned.

[51] Int. Cl.⁴ ............................. G01V 1/40; G01V 1/16
[52] U.S. Cl. ........................................ 340/858; 367/27; 367/79; 364/422
[58] Field of Search ............................ 73/151; 181/103; 324/338, 366; 340/856, 857, 858, 859; 364/421, 422; 367/25, 41, 27, 78, 79, 80

[56] References Cited

U.S. PATENT DOCUMENTS

| | | | |
|---|---|---|---|
| 3,366,924 | 1/1968 | Brown | 367/41 |
| 4,210,966 | 7/1980 | Ingram | 181/103 X |
| 4,350,979 | 9/1982 | Eberwein | 340/857 X |
| 4,451,790 | 5/1984 | Bravenec | 340/858 X |
| 4,456,983 | 6/1984 | Schoonover | 340/856 |
| 4,684,947 | 8/1987 | Zimmer | 367/27 |

Primary Examiner—Brian S. Steinberger
Attorney, Agent, or Firm—William J. Beard

[57] ABSTRACT

For use in an acoustic logging tool, an apparatus which digitizes simultaneously obtained acoustic signals is set forth in the preferred and illustrated embodiment. The device cooperates with N acoustic receivers in a sonde. After an acoustic pulse is transmitted, data is observed at all N acoustic receivers. This apparatus comprises a multiplexer which is connected to the several receivers. The several input signals are multiplexed, thereafter input to a digital data converter forming a procession of output digital words, and the words are stored in a selected order in a digital data buffer. They are delivered to the surface through a telemetry transmitter at a slower rate than the rate at which the data is created. In addition, a transmitter monitor is included. This provides a signal alternately digitized for a specified interval to enable coordination of the data reduction from the acoustic receivers in contrast with the timing of the transmitted acoustic pulse.

6 Claims, 2 Drawing Sheets

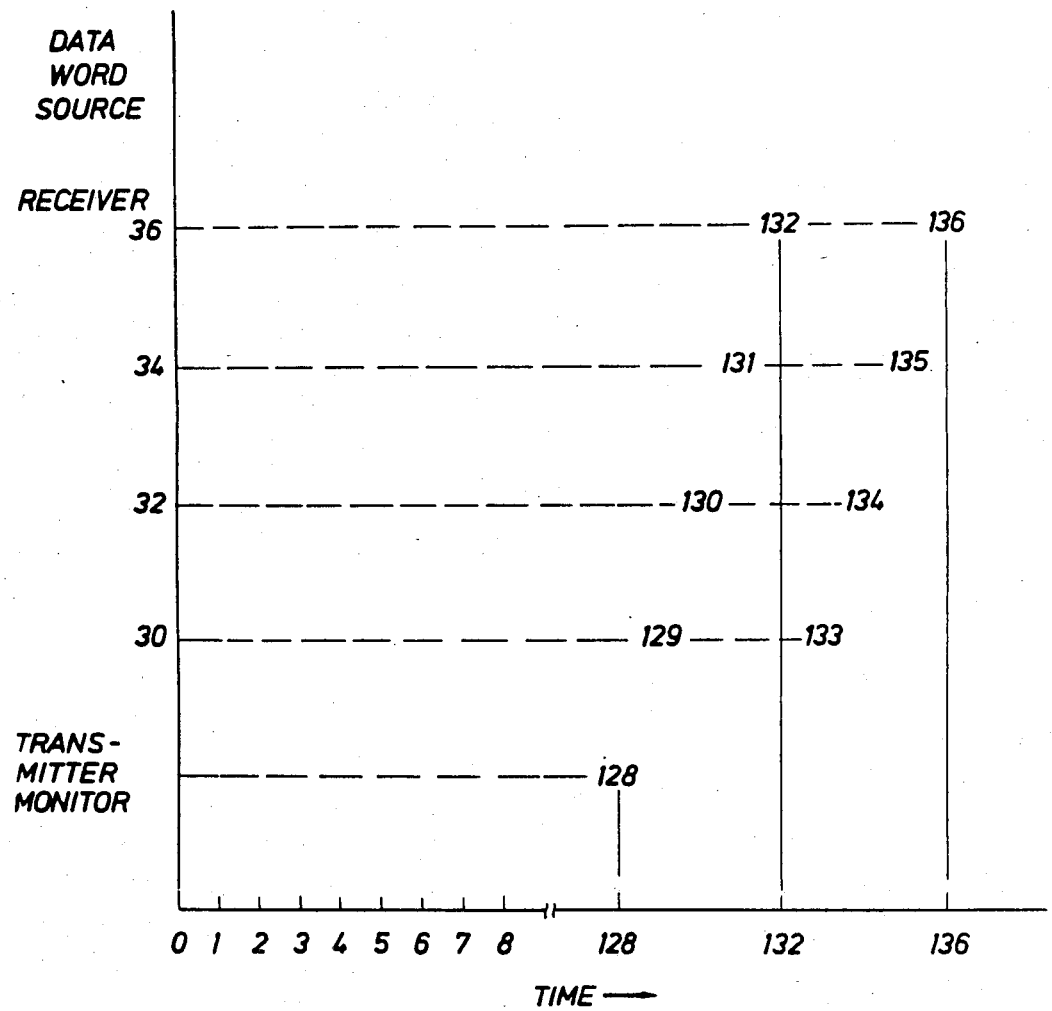

SIMULTANEOUS DIGITIZING APPARATUS FOR AN ACOUSTIC TOOL

This application is a divisional application of copending application Ser. No. 869,790 filed June 2, 1986, now issued as U.S. Pat. No. 4,684,947 on Aug. 4, 1987, which was a continuation of application Ser. No. 530283 filed Sept. 8, 1983 and now abandoned.

BACKGROUND OF THE DISCLOSURE

Acoustic logging tools utilize an acoustically coupled piezoelectric transducer to convert acoustic waves into output electrical signals. A typical acoustic logging tool incorporates an acoustic transmitter which propagates a pulse into the adjacent formation. A return pulse is received at the device. An input pulse is observed at each acoustic receiver. Better data interpretation can be obtained if there are multiple acoustic receivers. In a typical device there are N acoustic receivers, and they output data collectively indicating more subtle relationships. One subtle relationship is in the relative phase between the various receivers. The delay time of the propagated wave front in arriving at the different receivers is also important. A multitude of data is made available by such a device.

The data burst occurs in about 500 to 1,500 microseconds after the pulse is transmitted. Simultaneous data reception and telemetry is especially difficulty over a monocable. A monocable is a cable for supporting a downhole logging tool in a sonde wherein two conductors are included in the cable. While one function as ground, power is delivered on the other conductor to be transmitted from the surface to the sonde. Additionally, this pair of conductors is used to transmit data from the tool to the surface. This two conductor system provides a somewhat limited band width for data transmission, and it is not possible to crowd full data through the monocable in real time from N acoustic receivers.

One data transfer procedure has accommodated this limited data band width in the past is use of multiple firings of the transmitter, each firing dedicated to a single acoustic receiver. Thus, four separately created acoustic pulses would be propagated into the adjacent formations, and each of the four acoustic receivers would be sequentially operated to provide an output signal. This typically occurs as the tool is in transit up the borehole. There is an inevitable shift in position of the sonde between pulses. This movement makes it somewhat difficult to implement various data reduction procedures using N acoustic receivers where there has been a shift in the position of the acoustic transmitter and the respective receivers because each is working with different transmitted pulses. This has created difficulties in data reduction; the data reduction requires shifting to obtain time coincidence of the transmitted pulses. Since the shifted data is not what really happened, such data reduction techniques add to the complexity of interpretation. One important data reduction technique is cross correlation of the transmitted pulse and the one received pulse. The present invention enhances cross correlation.

The present apparatus and method enable use of multiple simultaneously operative acoustic receivers supported in acoustic well logging tools. The tool is lowered in a borehole. At a desired depth, the acoustic transmitter is operated to form a pulse. The pulse is transmitted into the adjacent formations and various acoustic signals are observed at N acoustic receivers on the tool. The various received signals are time multiplexed and stored in memory after conversion into a set of digital words. For each of the N acoustic receivers, the received signal can be reconstructed at the time of data reduction and interpretation. Moreover, the data is stored so that it can be subsequently transferred to the surface on a monocable by means of a suitable telemetry transmitter. With the data from N acoustic receiver signals in memory, the data can be removed from memory at a rate which permits it to be transmitted in the narrow width band available in a monocable. As will be understood, broad band transmission to enable high speed transmission of N simultaneously received acoustic signals is obtained only at the price of a more expensive apparatus capable of broad band transmission. The present apparatus enables the time log between acoustic events to be used for data transmission of N acoustic received events.

Many additional objects and advantages of the present apparatus will be more readily apparent on consideration of the device after its detailed description below. Such device and a method of obtaining data are set forth in detail below.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is a timing chart showing the timed sequence of various signals in a system having four acoustic receivers.

DETAILED DESCRIPTION OF THE PREFERRED EMBODIMENT

Figure 1:
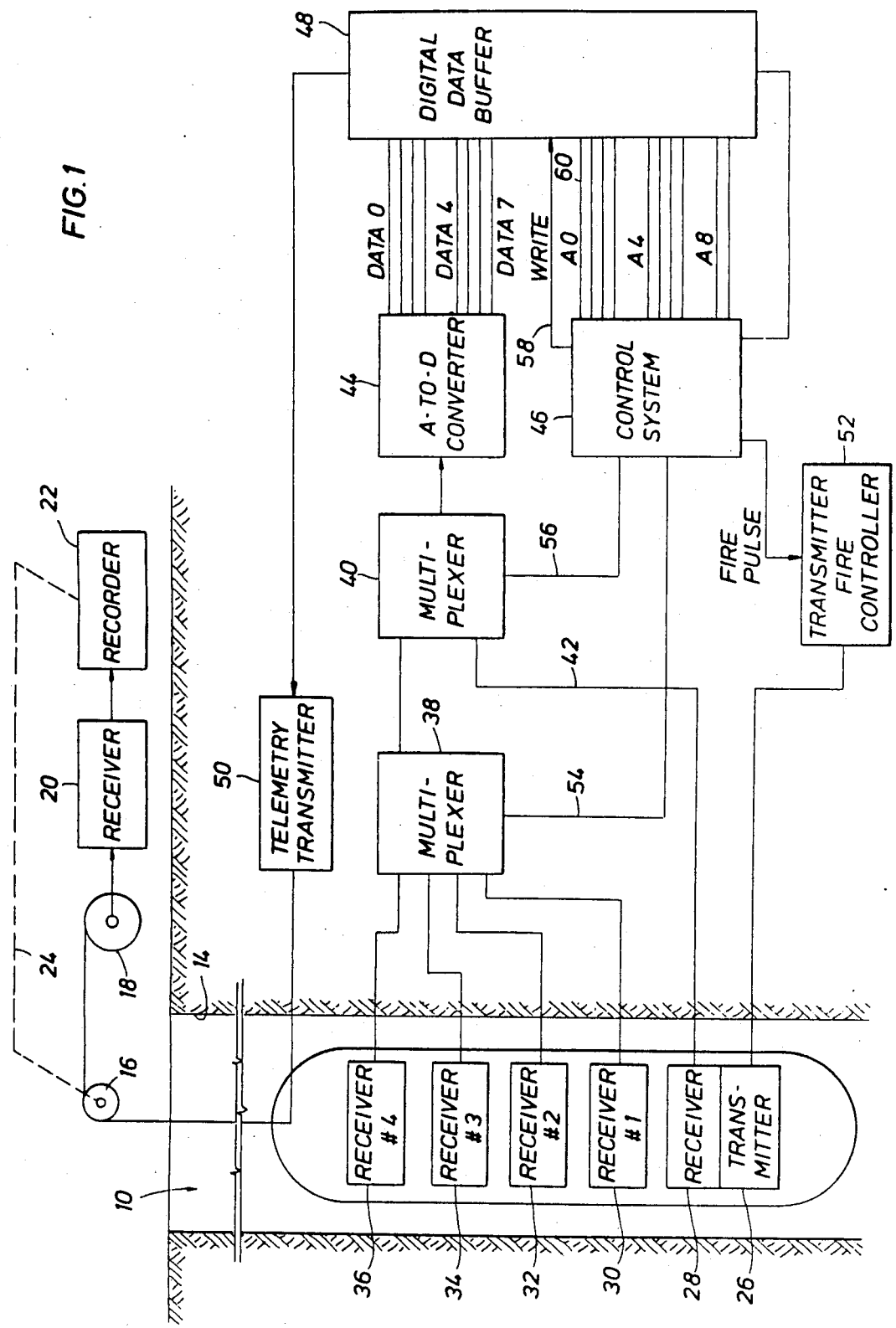
FIG. 1 shows the acoustic logging system constructed in accordance with this disclosure particularly featuring a multiplexed input to a digital data converter for temporarily buffering digitized data for subsequent transfer to the surface.

Attention is first directed to FIG. 1 of the drawings where an acoustic logging device is indicated generally by the numeral 10. It is supported on a monocable in a borehole 14 to thereby obtain acoustic logging data. The monocable extends upwardly to the surface to pass over a sheave 16. The sheave 16 directs the cable to a reel 18 which spools and stores several thousand feet of the cable. The cable is connected to a receiver 20. The receiver receives the acoustic logging data and transfers it to a recorder 22. The recorder 22 stores the logging data in a suitable medium such as on magnetic tape. The recorder 22 is connected by a mechanical or electronic means 24 to the sheave for the purpose of determning the depth of the sonde 10 in the borehole 14. This enables the data to be correlated to the depth in the well. In typical operations, the sonde 10 is lowered to the bottom of the well and then is retrieved from the well by spooling the cable onto the reel 18. As the sonde is raised in the well, acoustic pulses are transmitted in a controlled sequence. Data is obtained and recorded by the recorder 22 as a function of depth of the sonde 10 in the borehole.

The acoustic logging device incorporates an acoustic transmitter which is typically a piezoelectric crystal. The transmitter is identified by the numeral 26. The transmitter is immediately adjacent to an acoustic receiver 28. It functions as a transmitter monitor. It obtains a signal dependent on transmission; the acoustic receiver 28 provides an output signal indicative of transmission. It will be used in a fashion to be described. The acoustic logging tool 10 additionally supports several piezoelectric receivers. Moving from the bottom to the top of the tool, the numeral 30 identifies one receiver. A similar receiver is incorporated at 32. Additional receivers are shown at 34 and 36. They are preferably identical in operation and construction. They differ primarily in their location in the sonde. In particular, they are spaced at known distances from the transmitter.

If a pulse is transmitted into the formation, a received signal is observed at all four of the receivers. The several signals from the several receivers may differ in phase and amplitude. Valuable data is found in these differences.

The four receivers are input to a multiplexer 38. The multiplexer 38 is provided with N inputs. In this instance, N is four. As will be understood, the number of acoustic receivers can be varied. This number depends on the construction of the sonde 10 and the desired data from its operation. The output signals from the four receivers are analog signals.

The analog multiplexed signal is input to a next multiplexer 40. This multiplexer does not have to be a high speed multiplexer in the same fashion as the multiplexer 38. Preferably, the multiplexer 38 is able to settle in less than one microsecond so that microsecond scanning speeds for the N inputs can be accomplished. The multiplexer 40 is provided with two inputs. One is on the conductor 42 from the acoustic receiver 28. That signal is provided for the first designated interval (typically up to about two hundred microseconds) after the transmitted pulse has been formed. In other words, transmitter monitoring occurs for the first few hundred microseconds of a pulse transmission and reception sequence. During the first microseconds of operation, there is no signal at any of the acoustic receivers. It is therefore preferable to record the acoustic transmitter monitor signal to be able to determine timing and shape of the transmitted pulse. Later on, this data will less important and the more important data furnished from the high speed multiplexer 38 is then fed through the multiplexer 40. Multiplexer 40 therefore is initially operated to transfer only the transmitter pulse signal; that is ended after an interval, and thereafter the only signals for the multiplexer 40 are from the acoustic receivers. The multiplexer 40 is input to a high speed analog to digital converter 44. It converts the variable signals into an output digital signal having a specified word length and sign bit. Typically, eight bits in the data words are formed. Greater precision can be obtained at some sacrifice in complexity or speed.

This apparatus includes a control system 46. The control system 46 times operation of all the equipment. The control system is connected to a digital data buffer 48 which is a memory device for storing the data. The data is stored in a rank and file organization to be described. The data in the buffer 48 is periodically removed for a telemetry transmitter 50 to be transferred to the surface through the monocable 12.

The control system 46 forms a fire signal for a tansmitter fire controller 52 connected to the transmitter. This enables the correct timing of the transmitted pulse.

The control system 46 is additionally connected to the multiplexer 38 by means of a conductor 54. This gates the multiplexer 38 at a speed to be determined by the control system. Likewise, a control signal is provided on the conductor 56. The signal on the conductor 56 is input to the multiplexer switch 40. This instructs the circuit 40 to transfer either the transmitter signal or the multiplexed receiver signals. Additionally, the control system provides a write signal on a conductor 58. Data is written through several conductors at 60.

Data is written in an organized fashion in the digital data buffer 48. One organization for the digital data buffer is shown in FIG. 2 of the drawings. There, the four receivers are labelled on the ordinate. In addition, the transmitter monitor is also included. The abscissa is measured in microseconds. For the first few microseconds the only signal potentially available is the transmitter pulse. The transmitter monitor 28 provides a signal which is suitably digitized. Thus, the first few words into memory come from the transmitter pulse. All of these words are serially output from the high speed converter 44 into memory. FIG. 2 thus represents the first several words derived from the transmitter monitor and input into memory. It will be observed that the abscissa has a break to indicate that the number of words so stored can be varied. This is achieved by the control system 46 switching the multiplexer 40.

FIG. 2 thus shows that, after an interval, the last word is obtained from the transmitter monitor 28. The next digital word is from the receiver 30. In FIG. 2, scanning of the four receivers is shown. In the scale of FIG. 2, a digitized data word is obtained from each of the four input signals at a timed spacing of approximately four microseconds per input. The data rate for the system as a whole is much faster to enable scanning of four acoustic receivers. This data rate thus enables the words to be interlaced as they are placed in memory in a specified sequence. As data words are placed in memory, they are aligned in memory in the same sequence. Thus, FIG. 2 shows the interlacing of words sequentially obtained from the several receivers and stored in memory in the interlaced fashion.

This system should be considered for operation over an interval in which several acoustic pulses are transmitted. Assume as an example that an acoustic pulse is transmitted, and that the acoustic receiver 28 is operated for 128 microseconds. The first 128 words into memory are all obtained from the transmitter. The next step (under the control system 46) involves multiplexer 38 to multiplex the N inputs. The N inputs are individually input and digitized as the scanning is repeated. The pattern of input words for the digital data buffer 48 is preserved in the buffer.

Assume that the total time frame of collecting data is 1,000 microseconds or one millisecond. In that instance, 1,000 data words are obtained. Fortunately, the spacing of the data samples from the four acoustic channels afford sufficient data points to enable reconstruction of the analog signals at the time of data conversion. In any event, the buffer 48 stores 1,000 words. Assume further that the acoustic pulses will occur 500 milliseconds apart. If the logging tool is being raised in the borehole at a rate of 120 feet per minute or 2 feet per second, then spacing of 500 milliseconds enables data to be safely obtained approximately every foot. Recall that the data in the buffer was obtained over 1,000 microseconds or one millisecond. This data can then be transferred over a time interval less than about 490 milliseconds, a markedly slower rate of transfer. This slow rate enables the telemetry transmitter to obtain and transmit the data (1,000 data words) from the buffer to the surface. This data transfer occurs at such a slow rate that the pass band of the monocable imposes no particular limitation on the operation of the system. In fact, this slow rate of transfer of data is advantageous because it then enables the use of a monocable. The monocable is able to transmit this data through the telemetry transmitter in the sonde to the receiver at the surface without data degradation. The clarity and quality of data transfer is thus enhanced by the slow speed of transfer. While high speed transfer potentially could be had, the slow transfer is desirable to enable the use of the monocable.

Scale factors have been used above. Needless to say, they can be varied. For instance, the time duration of data capture can be shortened or lengthened. The sampling rate can also be shortened or lengthened. The number of data words can be varied so long as it does not exceed the capacity of the buffer 48. A typical buffer might hold perhaps 4K data words typically having an eight bit length. If needed, the memory can hold 16K or 32K data words. This is an adjustable factor which can be changed merely by placing a larger memory in the device. All of the data from logging thousands of feet of borehole, however, cannot simply be stored in memory. Rather, this apparatus enables the data to be stored momentarily in memory and transmitted by the transmitter 50 to the surface on the monocable at a time rate which is acceptable in light of the band pass of the monocable and the velocity of movement of the sonde 10 up the borehole.

While the foregoing sets forth the method and apparatus of the present invention, the scope is determined by the claims which follow.

What is claimed is:

1. For use in a well borehole to obtain multiple simultaneous data signals from N acoustic receivers carried by an elongated acoustic logging sonde sized and adapted for passage in a well borehole and suspended by a well logging cable having at least one data conductor, the multiple simultaneous digital signals formed in response to a single acoustic energy pulse from an acoustic transmitter carried by the sonde, a data collection and digitizing system comprising:
   (a) N acoustic receivers carried in said acoustic logging sonde for forming N time overlapping analog acoustic logging output signals from said N receivers where N is an integer;
   (b) first multiplexing means having N inputs connected to the outputs of the N acoustic receivers;
   (c) second multiplexing means connected to said first multiplexing means;
   (d) digital converter means operating at a first rate and connected to said second multiplexing means for forming a time based series of digital words representative of the outputs of said N receivers;
   (e) digital data buffer means in said sonde connected to said digital converter means for retaining in a formatted order a series of digital words from said converter means;
   (f) control means connected to said first and second multiplexing means for controlling operation of said first and second multiplexing means to form a series of digital words representative of the N acoustic logging output signals;
   (g) timing means incorporated with said control means to time digitizing by said digital converter means to operate both said first and second multiplexing means to form a series of digital words representing N acoustic logging output signals; and
   (h) telemetry transmitting means for telemetering said series of digital words from said buffer means along said at least one data conductor in the cable at a second transmitting rate which is slower than said first converter operating rate such that a single acoustic energy pulse from said acoustic transmitter generates N digital representations of the acoustic energy received at said N acoustic receivers corresponding to the arrival at each receiver of a single acoustic energy pulse.

2. The apparatus of claim 1 wherein said N acoustic receivers are longitudinally spaced along the sonde from one another.

3. The apparatus of claim 2 wherein said acoustic transmitter is located near one end of said sonde.

4. The apparatus of claim 1 including means for directing digital words from said digital converter means into specified addresses in said digital data buffer means.

5. A method of acoustic logging in a well borehole with an acoustic pulse transmitter on a well logging sonde supported by cable wherein the cable has at least one data signal conductor and wherein there are N acoustic receivers on the sonde N being an integer to observe time overlapping received acoustic signals, the method comprising the steps of:
   (a) transmitting an acoustic pulse by an acoustic transmitter;
   (b) receiving N overlapping acoustic signals resulting from the transmitted acoustic pulse at said N acoustic receivers along the well borehole and forming an analog signal from each of said N acoustic receivers;
   (c) multiplexing the overlapping N received analog signals at first and second different multiplexing rates;
   (d) digitizing the multiplexed N analog signals into a series of digital words encoding the N analog signals;
   (e) storing the digital words encoding the N analog signals in a specified sequence in the memory; and
   (f) telemetering from the sonde along said at least one data signal conductor along the cable supporting the sonde to the surface digital words in the memory representing the N received signals, wherein the telemetry rate is slower than the rate used for storing said digital words.

6. The method of claim 5 wherein the step of multiplexing includes sequential scanning of N acoustic analog signals at a multiplexing scanning rate which is different from said first and second different multiplexing rates.

* * * * *